Patented Oct. 17, 1939

2,176,799

UNITED STATES PATENT OFFICE

2,176,799

REGENERATED ARTIFICIAL STRUCTURE AND PROCESS OF MAKING SAME

Leon Lilienfeld, Vienna, Austria; Paul Abel, executor, Vienna, Austria, (Germany), or, in case of his inability to act, Emerich Hunna, Vienna, Austria (Germany), and Antonette Lilienfeld, Vienna, Austria, (Germany), sole heir of Leon Lilienfeld, deceased No Drawing. Application October 22, 1935, Serial No. 46,164. In Great Britain March 15, 1930

8 Claims. (Cl. 18—54)

The present application is in part a continuation of my copending application 521,020, (now Patent No. 2,021,864) filed March 7, 1931, which application covers a modification of my earlier application 435,649, filed March 13, 1930 (now Patent No. 2,021,862).

In that last mentioned specification I have described a manufacture of artificial threads or other shaped structures, wherein a product of the action of a halogen derivative of a di- or polyhydric alcohol on viscose is brought into the appropriate shape or form and acted upon with an agent which has a coagulating effect on the shaped material and a plasticizing effect on the freshly coagulated material. Instead of a halogen derivative of a di- or poly-hydric alcohol there may be used in the said manufacture a halogen fatty acid, as described in my specification Ser. No. 464,425, (now Patent 2,087,981), or a trithiocarbonic acid ester as described in my specification Ser. No. 464,427 (now Patent No. 2,021,863).

As a variant of the operation as described in said prior cases, the shaped material may be treated first with an agent which has the coagulating effect and then with an agent which has the plasticizing effect on the freshly coagulated artificial structure.

The products of the manufacture are remarkable in that they unite in themselves three important properties, namely sufficiently high lustre, very high tenacity in the dry and wet state, and, notwithstanding that, a degree of extensibility sufficient for all practical purposes.

The present invention covers the use of such alkylating reagents as dialkyl sulphates, instead of the halogen derivative of a di- or polyhydric alcohol, for reacting with the viscose to produce the intermediate. This alkylating reagent can be added to the viscose, whereby the xanthate of cellulose is transformed into a more complex xanthate. The dialkyl sulphate is substituted, in the process, instead of the halogen derivative of a di-or polyhydric alcohol.

Since the practice of the process is exactly as set forth in the aforesaid parent specification, 435,649, and explained therein by aid of numerous examples, it appears superfluous to repeat here all particulars relating to the carrying out of the present process under various working conditions and to give here examples demonstrating all possible modifications of working the present invention. In conjunction with the detailed description and the examples of specification Ser. No. 435,649, the following examples appear to be sufficient to illustrate the practical execution of the invention which, however, is by no way limited to these examples.

Example 1 (a) to (h)

(a) 100 parts of wood pulp (water content=8 per cent) or cotton linters (water content=6–7 per cent) are introduced into 2000 parts of caustic soda solution of 18 per cent strength at 15° C. and allowed to remain therein for 3 hours; the alkali cellulose is then pressed until, in the case of wood pulp it weighs 300 parts and in the case of linters 340 parts, and is then comminuted at 11–15° C. during 2½–3 hours; in the case of wood pulp 40 parts, and in the case of linters 60 parts of carbon disulphide are added and the carbon disulphide is allowed to act for 8 hours at 18–20° C., any excess of carbon disulphide is then blown off during 10–15 minutes, and the xanthate thus obtained is dissolved by using so much caustic soda and water that the solution obtained contains about 6.5 per cent of cellulose determinable analytically and 8 per cent of NaOH. This forms viscose suitable for further treatment by this process, but the invention is not restricted to the use of this viscose, since other formulas can be used.

When the dissolution is complete, 70 parts of di-ethyl sulphate are added to the viscose, and well stirred in, and the solution is then filtered three times through cotton, two filtrations being carried out soon after its preparation, while the third immediately precedes the spinning process. Before this spinning solution is spun, it is left to age for 96 to 100 hours at a temperature of 15° C. The spinning is as follows:

The spinning solution is pressed at a speed of 3.3 c. c. per minute through a platinum nozzle having 54 perforations of 0.1 mm. diameter, into a bath containing 61 to 64 per cent of $H_2SO_4$ and having a temperature of 16° C., the length of immersion of the thread in the sulphuric acid being 20 cm. The thread is then allowed to pass for 120 cm. through the air and is wound on a bobbin revolving at a speed which produces a speed of spinning of about 18 m. per minute. Three glass rods are placed angularly to one another between the spinning bath and the bobbin over which rods the threads are conducted and are thus subjected to an additional stretching or tension. The lower part of the bobbin revolves in water, so that the sulphuric acid is removed or considerably diluted as soon as the thread arrives at the bobbin. The threads are then washed, purified, twisted and finished in the usual manner.

The threads obtained consist of single filaments of about 2 to 2.5 deniers each.

(b) The same mode of operation as in (a), but with the variation that the temperature of the spinning bath is —5° C.

(c) The same mode of procedure as in (a) but with the difference that 3 c. c. of the spinning solution are discharged per minute, that the nozzles have 24 perforations of 0.1 mm. diameter, that the setting bath contains 58 to 62 per cent of $H_2SO_4$ and has a temperature of 0° C., and that the length of immersion of the thread in the setting bath is 80 cm.

The titre of the single filaments is about 4 to 5.5 denier.

(d) The same mode of procedure as in (a) or (b), but with the exception that 6.2 c. c. of the spinning solution are discharged per minute, that the nozzles have 100 perforations of 0.08 mm. diameter and that the speed of spinning is 40 m. per minute.

The titre of the single filaments is about 1 to 1.4 denier.

(e) The process is conducted as in (a) or (b), but with the difference that 3 c. c. of the spinning solution are discharged per minute, that the nozzles have 100 apertures of 0.08 mm. diameter, that the speed of spinning is 30 m. per minute and that the strength of the sulphuric acid is 58 to 61 per cent of $H_2SO_4$.

(f) Mode of procedure as in (a) or (b), but with the difference that only 1.6 c. c. of the spinning solution is discharged per minute and that the nozzles have 100 perforations of 0.08 mm. diameter and that the strength of the sulphuric acid is 58 to 60 per cent of $H_2SO_4$.

(g) The process is conducted as in (d), but with the difference that the spinning solution is charged at a speed of about 14 c. c. per minute, that the speed of spinning is about 100 to 120 m. per minute, that the thread is not subjected to additional stretching and that the length of immersion is 80 to 100 cm.

(h) The same procedure as in (a) to (g), with the exception that the setting bath contains 40 per cent of $H_2SO_4$.

Example 2 (a) to (h)

The process is conducted as in any one of the Examples 1 (a) to (h), but with the difference that instead of 70 parts, 100 parts of di-ethyl sulphate are added to the viscose and that before spinning the reaction mixture is allowed to age for about 60 hours only. After about 2–3 hours calculated from the time of the addition of the di-ethyl sulphate, the reacting mixture jellifies, but liquefies again within another 12 hours or so.

The concentration of the spinning acids are as follows:

| | Per cent $H_2SO_4$ |
|---|---|
| Spinning method (a) or (b) | 57 to 61 |
| Spinning method (c) | 55 to 59 |
| Spinning method (d) and (g) | 54 to 61 |
| Spinning method (e) | 54 to 57 |
| Spinning method (f) | 51 to 54 |
| Spinning method (h) | 40 |

Example 3 (a) to (h)

The process is conducted as in any one of the Examples 1 (a) to (h), but with the difference that, after the sulphidizing step, the cellulose xanthate is dissolved in such a quantity of caustic soda and water as to yield a viscose containing about 6.5 per cent of analytically determinable cellulose and 5 per cent of NaOH and that only 40 to 50 parts of di-ethyl-sulphate are added to the viscose.

Example 4 (a) to (h)

The process is conducted as in any one of the Examples 1 (a) to (h), but with the difference that, instead of the 70 parts of di-ethyl sulphate 60 parts of di-methyl-sulphate are added to the viscose.

Example 5 (a) to (h)

The process is conducted as in any one of the Examples 1 (a) to (h), but with the difference that, instead of the di-ethyl sulphate, 40 parts of di-methyl sulphate are employed.

Example 6 (a) to (h)

The process is carried out as in any one of the preceding examples, but with the difference that, before entering the strong sulphuric acid, the thread-like stream is conducted through one of the following baths:

(1) A solution of ammonium sulphate of 25 to 30 per cent strength; or (2) A bath consisting of 500 parts of sodium bisulphate, 76 parts of sulphuric acid of 66° Bé. and 587 parts of water, which bath may be kept at room temperature or at a raised temperature, for instance 50° C., or (3) A bath consisting of 982 parts of water, 180 parts of sodium sulphate, 60 parts of ammonium sulphate, 15 parts of zinc sulphate, 135 parts of glucose, and 128 parts of sulphuric acid of 66° Bé.

Example 7

A spinning solution, produced in the manner described in any one of the foregoing examples is introduced in the known manner in the form of a sheet, into any one of the plasticizing liquids named in any one of the foregoing examples through a suitable hopper or slit, and the coagulated film band, after having been run through this bath, is washed in the known manner and dried.

Example 8

A cotton material is impregnated or filled, or coated, one or several times, on a suitable machine, for instance a padding machine, or a backfilling machine, or a spreading machine, with a xanthate solution produced in the manner described in any one of the foregoing examples, to which solution a filling material such as talc or china clay (for instance 100 to 200 per cent calculated on the weight of the cellulose) or a dyestuff or a pigment (such as mica, or lampblack) may be added and after, or without being dried, if necessary in a state of tension, is passed through a bath having the composition of any one of the plasticizing liquids mentioned in the foregoing examples. The dressed or coated fabric is then washed and dried.

In carrying out the process of the present invention, it is sometimes advisable to add the di-alkyl sulphate (or alkyl ester of an oxygen-containing mineral acid) to the cellulose sodium xanthate directly after the sulphidizing operation, or after standing for 12 to 144 hours or longer, without first adding a considerable amount of aqueous caustic alkali solution to dissolve the xanthate. In this way the dialkyl sulphate acts more quickly on the xanthated cellulose, and the dialkyl sulphate (or other alkyl ester) used is more completely utilized. This modification is described and claimed in my co-pending application Ser. No. 540,805, filed May 28, 1931.

A portion of the dialkyl sulphate used in the above example can be substituted by an equivalent amount of any of the reagents mentioned in the parent application, or in the basic application 435,649, or in the applications 464,425 or 464,427, or mixtures of these reagents.

In a further modification, instead of reacting on alkali cellulose directly with carbon bisulphide, the said alkali cellulose can first be treated with a small amount of any of the reagents referred to in the last paragraph, then agitated, warmed somewhat if necessary to bring about reaction, and then the mass (after washing and again adding caustic alkali, if desired) treated with carbon bisulphide as above described, dissolved, treated with the dialkyl sulphate, and the xanthate solution worked as above described.

Instead of the alkyl esters of sulphuric acid, the corresponding esters of phosphoric acid or of nitric acid (i. e., oxygen-containing mineral acids) can be employed for reacting on the viscose.

In this process, the thread (or analogous artificial structure) may be subjected to additional stretching, during some portion of its travel between the spinnerette and the quenching of the strong sulphuric acid (plasticizing bath) or not, as desired.

In place of strong sulphuric acid (sulphuric acid of 35% concentration, or stronger) other plasticizing baths can be employed, such as hydrochloric acid of 20 to 35% concentration or stronger, nitric acid of 60–90%, or phosphoric acid of 1.5 to 1.86 s. g. (67.5 to 99% $H_3PO_4$) or strong arsenic acid of 60–90% $H_3AsO_4$ or other mineral acids of equivalent strength, or mixtures thereof, or strong zinc chloride solution of about 60% strength containing about 4–6% HCl, or a solution of 13.3 parts of ammonium sulphate in 120 parts of sulphuric acid of 62–70% strength, to which 9–10 parts of 66° Bé. $H_2SO_4$ is added, or mixtures of bisulphates or other acid salts with sulphuric acid or other mineral acid, having an acidity equivalent to that of sulphuric acid of 35% concentration or stronger, or in other words, any plasticizing bath of which many have been proposed for use in the production of viscose silk or viscose threads of high dry and wet tenacity.

The plasticizing bath may be kept at below room temperature, say at 0° to 10° C., or at room temperature, or at a higher temperature, say at 25° to 45° C.

The threads may be stretched by any one of the known methods, either in the plasticizing bath or after they have left it. This may be arranged by making the distance of the collecting device from the second setting bath very large, or by conducting the threads over one or several rods, hooks, rollers, or differential rollers, which are arranged between the nozzle and the collecting device in the second bath or outside it or at both places.

The threads are collected, while the sulphuric acid or other plasticizing agent is removed or diluted by washing as has previously been described, and the threads are finally washed completely, dried and treated in the manner described in application, Serial Number 435,649.

While the extensibility of the artificial threads produced by this present process is generally sufficient (usually about 6.5 to 8.5%) the extensibility can be further increased if desired, by subjecting the threads to an after-treatment, such as described and claimed in my U. S. Patents 1,989,098 to 1,989,101, inclusive, and 2,001,621.

The desulphurizing and refining of the threads or other final structures can be practiced according to the processes of my Patents 2,004,875–6–7 of June 11, 1935.

In a further modification, a catalyst can be employed. For example 2 parts of copper acetate or of zinc acetate are dissolved in 5 parts of water, and added to the viscose made from 100 parts of the original cellulosic material.

Many other particulars relating to the carrying out of the process as well as the principal modifications of same, for example various kinds of cellulose that may be used, instead of wood-pulp or cotton linters, the various plasticizing agents which can be used in lieu of strong sulphuric acid, are described in specification Ser. No. 435,649.

It is to be understood that the dimethyl sulphate and diethyl sulphate are given merely as examples of the alkyl esters of oxygen-containing mineral acids, without restricting the invention to these specific compounds, or to alkyl radicals containing only one or two carbon atoms.

The expression "viscose or cellulose xanthate" wherever the context permits includes cellulose xanthates or their solutions or their derivatives or solutions of cellulose xanthate derivatives.

The expression "artificial structure" used in the specification and claims includes: artificial threads, particularly artificial silk; films; coatings and layers of every kind; dressings on textiles, paper, leather and the like; sizing on yarns; book cloth; artificial leather; plates and shaped or partly shaped plastic compositions in general, and the like.

The term "artificial threads" denotes artificial threads and spun goods of all kinds, for instance artificial silk, staple fibre, artificial cotton, artificial wool, artificial hair, and artificial straw of any kind.

The expression "strong mineral acids" denotes sulphuric acid of at least 35 per cent of $H_2SO_4$, preferably at least 45 per cent of $H_2SO_4$, and as regards the other mineral acids, solutions of equivalent strength.

The expression "strong sulphuric acid" or "sulphuric acid containing at least about 35 per cent of sulphuric acid monohydrate" denotes sulphuric acid having a content of 35 to 98 per cent of $H_2SO_4$.

The products obtained in the present process belong to the class of the so-called strong artificial structures, for example strong artificial threads.

To define this property more closely, artificial threads, e. g. artificial silk, shall serve here as example. Now, artificial silk is called "strong silk" when it has a dry tenacity substantially exceeding 2 grams per denier.

It is a well known fact that when viscose is spun into strong sulphuric acid, the resultant threads are very strong, i. e., have a dry tenacity by far exceeding 2 grams per denier. On the other hand, this strong viscose silk (which in the literature is called "Lilienfeld silk") has a low extensibility, for example an extensibility of 4 to 6 per cent. Only by some special after-treatment is it possible to increase the extensibility of Lilienfeld silk. In contrast with this, it is possible, according to the present invention, to produce artificial threads which, without any special after-treatment have a dry tenacity exceeding 2 grams per denier and, nevertheless, an extensibility sufficient for all practical purposes, for example an extensibility of at least 8 per cent and in some cases reaching 12 to 15 per cent and even more.

Since, in all probability, a reaction takes place between the parent xanthate and the inorganic alkyl esters, most of the final products of the invention contain some alkyl groups, which fact can be established in the known manner by decomposing the products by hydriodic acid according to the Zeisel method. In addition, most of the products of the present invention, after having been desulphurized by any method known in the viscose art, contain still sulphur which can be detected by heating the products, e. g., artificial silk, with caustic soda solution in presence of a soluble lead salt, whereby, according to the amount of sulphur present, the products turn brownish grey, or brown, or black.

Consequently, the final products are characterized by a dry tenacity corresponding with more than 2 grams per denier, by the presence of such alkyl groups as are contained in inorganic alkyl esters and by the presence of sulphur even after having been desulphurized by any desulphurizing method known in the artificial silk art, including my Patents 2,004,875-6-7 mentioned above.

I claim:

1. A process of making artificial structures which comprises adding to a xanthate of a cellulosic material, an alkyl ester of an oxygen-containing mineral acid, and treating a solution containing the so produced cellulosic reaction product, in the form of a dissolved xanthate, while having the shape of the desired artificial structure, with a coagulating agent, and plasticizing the freshly coagulated artificial structure.

2. A process of making artificial structures which comprises adding to a xanthate of a cellulosic material, a dialkyl sulphate, and treating a solution containing the so produced cellulosic reaction product, in the form of a dissolved xanthate, while having the shape of the desired artificial structure, with a coagulating agent, and plasticizing the freshly coagulated artificial structure.

3. A process of making artificial threads which comprises introducing into a coagulating bath, a preshaped thread-like alkali solution containing the dissolved reaction product of an alkyl ester of an oxygen-containing mineral acid upon a xanthate of a cellulosic body, and plasticizing the freshly coagulated material.

4. A process of making artificial threads which comprises introducing into a coagulating bath, a preshaped thread-like alkali solution containing the dissolved reaction product of a dialkyl sulphate upon viscose and plasticizing the freshly coagulated material.

5. A process which comprises introducing into a coagulating and plasticizing bath, a preshaped solution containing in a dissolved state, a cellulosic reaction product of an alkyl ester of an oxygen-containing mineral acid upon a xanthate of a cellulosic body.

6. A process which comprises introducing into a bath containing at least 35% of $H_2SO_4$, a preshaped solution containing in a dissolved state, a cellulosic reaction product of an alkyl ester of an oxygen-containing mineral acid upon a xanthate of a cellulosic body.

7. Artificial regenerated cellulose alkyl ether structures which have a tenacity equivalent to that of a thread having a dry tenacity at least 2 grams per denier, and which structures have an extensibility equivalent to that of a thread having an extensibility of about 8 to 15%, and which products even after desulphurization by immersion in a 30% solution of $Na_2S.9H_2O$ for two minutes at 100° C., followed by rinsing in hot water and then washing in cold water, still contain sulphur which can be detected by heating with caustic soda solution in the presence of lead salts, such structures being substantially identical with the products produced by the process of claim 1.

8. Regenerated artificial cellulose alkyl ether threads, which have a dry tenacity at least 2 grams per denier, and an extensibility of about 8 to 15% and which products after desulphurization, still contain sulphur which can be detected by heating with caustic soda solution in the presence of lead salts, such threads being substantially identical with the products produced by the process of claim 3.

LEON LILIENFELD.